(12) United States Patent
Hatano

(10) Patent No.: US 8,917,257 B2
(45) Date of Patent: Dec. 23, 2014

(54) COORDINATE DETECTING DEVICE AND COORDINATE DETECTING PROGRAM

(75) Inventor: Naoyuki Hatano, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 109 days.

(21) Appl. No.: 13/527,186

(22) Filed: Jun. 19, 2012

(65) Prior Publication Data

US 2012/0319994 A1 Dec. 20, 2012

(30) Foreign Application Priority Data

Jun. 20, 2011 (JP) ................. 2011-136629

(51) Int. Cl.
*G06F 3/045* (2006.01)
*G06F 3/041* (2006.01)
*G06F 3/044* (2006.01)

(52) U.S. Cl.
CPC .............. *G06F 3/044* (2013.01); *G06F 3/0418* (2013.01); *G06F 2203/04104* (2013.01); *G06F 2203/04112* (2013.01)
USPC .......................................... 345/174; 345/173

(58) Field of Classification Search
CPC ..... H03K 17/962; H03K 17/955; G01D 5/24; G06F 3/044; G06F 3/0488; G06F 3/0412; G06F 3/0414; G06F 3/0416; G06F 3/0418; G06F 3/046; G06F 3/047; G06F 3/041; G06F 3/04; G06F 3/042; G06F 3/043

USPC .................................................. 345/173–179
See application file for complete search history.

(56) References Cited

U.S. PATENT DOCUMENTS

| | | | |
|---|---|---|---|
| 5,644,108 A * | 7/1997 | Katsurahira et al. ........ 178/18.07 |
| 8,477,106 B2 * | 7/2013 | Salaverry et al. ............. 345/173 |
| 2007/0109274 A1 * | 5/2007 | Reynolds ....................... 345/173 |
| 2008/0012835 A1 * | 1/2008 | Rimon et al. .................. 345/173 |
| 2009/0251434 A1 * | 10/2009 | Rimon et al. .................. 345/173 |
| 2010/0097329 A1 * | 4/2010 | Simmons et al. ............. 345/173 |
| 2010/0149127 A1 * | 6/2010 | Fisher et al. ................... 345/174 |
| 2010/0253630 A1 | 10/2010 | Homma et al. |

* cited by examiner

*Primary Examiner* — Dwayne Bost
*Assistant Examiner* — Stefan M Oehrlein
(74) *Attorney, Agent, or Firm* — Brinks Gilson & Lione

(57) ABSTRACT

A coordinate detecting device includes a detecting unit configured to detect the capacitance of each of a plurality of electrodes arranged in a predetermined direction and an arithmetic processing unit configured to calculate the coordinates of a detection target using different calculation methods according to the state of a variation in the capacitance of the plurality of electrodes. The arithmetic processing unit calculates the coordinates of the detection target, using one of a centroid calculation method of calculating the coordinates of the centroid and a curve approximation method of calculating a peak of a curve according to a comparison value between a capacitance variation of a peak electrode and a capacitance variation of an electrode which is not adjacent to the peak electrode.

13 Claims, 10 Drawing Sheets

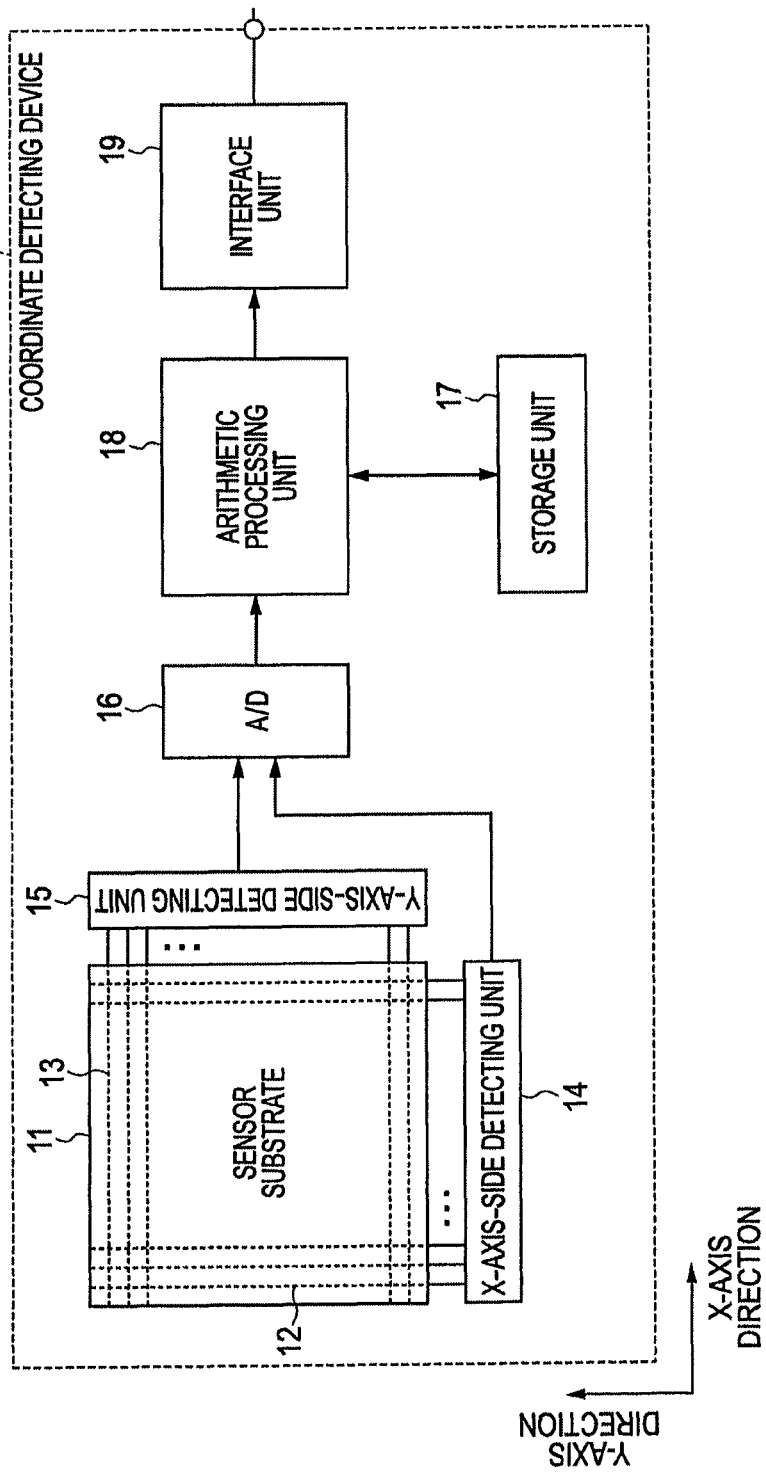

CENTROID CALCULATION METHOD

CURVE APPROXIMATION METHOD

COORDINATE DETECTING DEVICE AND COORDINATE DETECTING PROGRAM

CLAIM OF PRIORITY

This application claims benefit of Japanese Patent Application No. 2011-136629 filed on Jun. 20, 2011, which is hereby incorporated by reference in its entirety.

BACKGROUND

1. Field of the Disclosure

The present disclosure relates to a coordinate detecting device and a coordinate detecting program, and more particularly, to a coordinate detecting device and a coordinate detecting program related to an operation on a screen.

2. Description of the Related Art

In recent years, a device including a coordinate detecting device which specifies a position where the finger touches to operate an electronic apparatus has been actively developed in electronic apparatuses, such as a computer, a mobile phone terminal, and a PDA (Personal Digital Assistant).

For example, as the device including the coordinate detecting device, there is a pointing device (coordinate input device) which is called a pad, a touch pad, or a track pad provided in the computer. The coordinate input device is incorporated into a portable notebook personal computer or is attached to the outside of a desktop computer, and is then used. In this case, it is not necessary to move the coordinate input device, unlike a mouse. Therefore, it is possible to operate the coordinate input device in a limited space, such as on a desk, without any difficulty.

For example, in a portable apparatus, such as a mobile phone terminal or a PDA in which the coordinate detecting device is incorporated into a display screen, the user can directly touch the display screen (operation surface) with the fingers to perform a desired operation.

For example, as the coordinate detecting device, there is a device which uses a variation in capacitance formed between an electrode and a portion around the electrode due to the contact of the finger of the user. In general, a capacitance-type coordinate detecting device includes a plurality of electrodes that are arranged in a matrix in the X-axis direction and the Y-axis direction and a detecting unit that detects the capacitance of each electrode, and detects electrodes with a large capacitance variation in the X-axis direction and the Y-axis direction among the plurality of electrodes, thereby specifying the position where the user touches.

As a capacitance-type coordinate detecting method, for example, a method has been proposed which calculates coordinates on the basis of the position of the centroid of an effective region with a capacitance variation equal to or greater than a predetermined value (for example, JPA-2010-244302).

However, for example, in a capacitance-type touch pad, in some cases, the finger which does not directly touch the operation surface, but approaches the operation surface has a great effect on a change in the capacitance of the electrode. In addition, in some cases, a large variation occurs in the touch area depending on the method of touching the operation surface with the finger. In this case, when the coordinates are constantly calculated on the basis of the position of the centroid, the detected coordinates are changed by the influence of the finger which does not touch the operation surface or depending on the method of touching the operation surface with the finger, which may cause a reduction in the detection accuracy of the coordinates.

SUMMARY

According to an aspect, there is provided a coordinate detecting device including: a plurality of electrodes arranged in a predetermined direction; a detecting unit configured to detect the capacitance of each of the plurality of electrodes; and an arithmetic processing unit configured to calculate the coordinates of a detection target, using different calculation methods according to the state of a variation in the capacitance of the plurality of electrodes. The arithmetic processing unit calculates the coordinates of the detection target, using one of a centroid calculation method of calculating the coordinates of the centroid and a curve approximation method of calculating a peak of a curve according to a comparison value between a capacitance variation of a peak electrode and a capacitance variation of an electrode which is not adjacent to the peak electrode. According to this structure, the coordinates of the detection target are calculated using different calculation methods according to the state of use. Therefore, even when the state of use is changed, it is possible to detect the coordinate with high accuracy.

In the coordinate detecting device according to the above-mentioned aspect, when an absolute value of the difference between the capacitance variation of the peak electrode and the capacitance variation of the electrode which is not adjacent to the peak electrode is equal to or less than a predetermined value, the arithmetic processing unit may apply the centroid calculation method to electrodes in a first recognition region which includes at least successive electrodes with a capacitance variation equal to or greater than a first threshold value from the peak electrode, thereby calculating the coordinates of the detection target. When the absolute value of the difference between the capacitance variation of the peak electrode and the capacitance variation of the electrode which is not adjacent to the peak electrode is greater than the predetermined value, the arithmetic processing unit may apply the curve approximation method to electrodes in a second recognition region which includes at least the peak electrode and an electrode adjacent to the peak electrode, thereby calculating the coordinates of the detection target.

According to another aspect of the invention, there is provided a coordinate detecting program that allows a computer to perform an arithmetic process for determining the coordinates of a detection target on the basis of capacitance variations of a plurality of electrodes which are arranged in a predetermined direction. The coordinate detecting program includes: a step of recognizing a peak electrode with the largest capacitance variation from a plurality of detected electrodes; a step of comparing a capacitance variation of the peak electrode with a capacitance variation of an electrode which is not adjacent to the peak electrode; a step of applying a centroid calculation method to electrodes in a first recognition region which includes at least successive electrodes with a capacitance variation equal to or greater than a first threshold value from the peak electrode, thereby calculating the coordinates of the detection target, when an absolute value of the difference between the capacitance variation of the peak electrode and the capacitance variation of the electrode which is not adjacent to the peak electrode is equal to or less than a predetermined value; and a step of applying a curve approximation method to electrodes in a second recognition region which includes at least the peak electrode and an electrode adjacent to the peak electrode, thereby calculating the coordinates of the detection target, when the absolute value of the difference between the capacitance variation of the peak electrode and the capacitance variation of the electrode which is not adjacent to the peak electrode is greater than the predetermined value.

BRIEF DESCRIPTION OF THE DRAWINGS

FIG. 1 is a block diagram illustrating a coordinate detecting device according to an embodiment;

DESCRIPTION OF THE EXEMPLARY EMBODIMENTS

Figure 2A:
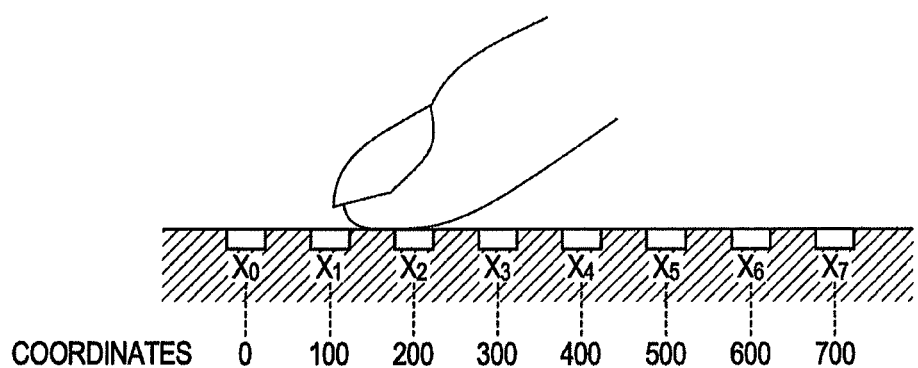
FIG. 2A is a schematic diagram illustrating a case in which the tip of the finger touches an operation surface.

In a capacitance-type coordinate detecting device, as described above, the coordinates are calculated on the basis of a variation in the capacitance of the electrodes provided on a sensor substrate. Therefore, the calculation of the coordinates is affected by the number of electrodes formed on the sensor substrate or the distance between the electrodes. In order to improve the detection accuracy of the coordinates, it is preferable to increase the number of electrodes (reduce the distance between the electrodes). In some cases, in order to reduce costs or simplify an arithmetic process, it is preferable to reduce the number of electrodes (increase the distance between the electrodes).

In general, the optimal number of electrodes may be determined by, for example, the area of an operation surface, the size of a detection target (for example, a human finger), and resolution (the distance between the electrodes with respect to a unit coordinate). For example, when the detection target is a human finger, it is preferable that the optimal distance between the electrodes be equal to or slightly more than a touch region when the tip of the finger touches the operation surface, considering, for example, detection accuracy or costs.

However, the inventors examined and found that, even when the distance between the electrodes was set as described above, in some cases, there was a large variation in the detected coordinates due to the state of use (for example, depending on how the user touches the operation surface). The inventors studied this point in detail and found that there were two main ways to touch the operation surface with the finger of the user and the touch area between the finger and the operation surface was classified into two states depending on the state of use.

Specifically, there are a case in which the tip of the finger taps the operation surface (touch area is small) and a case in which the pad of the finger touches the operation surface (touch area is large). For example, when the user touches the operation surface with long fingernails, in many cases, the ball of the finger (solid finger) touches the operation surface and the touch area tends to increase.

In addition, the inventors studied in detail a plurality of capacitance variations in the two states and found that there was a large variation in the distribution of the capacitance variations of an electrode (peak electrode) with the largest capacitance variation and electrodes in the vicinity of the peak electrode when the tip of the finger touched the operation surface and when the solid finger touched the operation surface.

The inventors conceived a technique which applied different calculation methods according to the state of the detected capacitance variations of a plurality of electrodes when calculating the coordinates of a position where the detection target touched. Specifically, for example, when the tip of the finger touches the operation surface (touch area is small), when the solid finger touches the operation surface (touch area is large), and when noise occurs, different calculation methods are used to calculate the coordinates of the detection target. Next, the relationship between the state of use and a coordinate calculation method will be described.

Figure 2B:
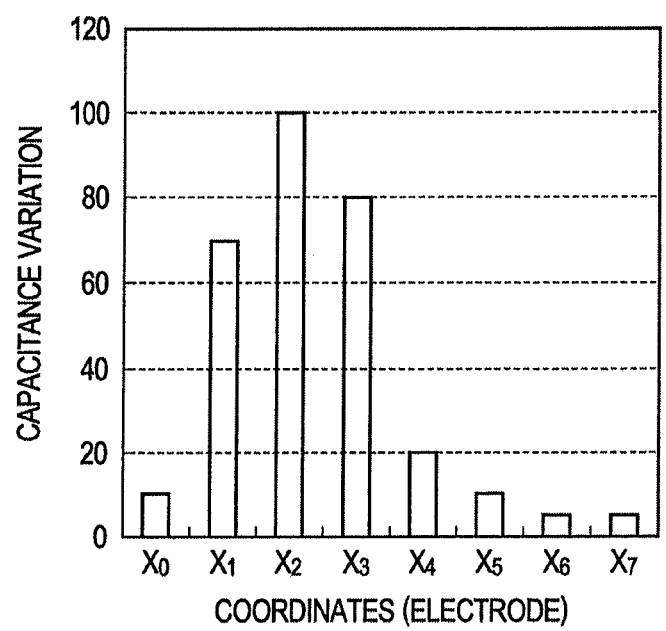
FIG. 2B is a diagram illustrating a variation in the capacitance of each electrode.

FIG. 2A is a schematic diagram illustrating a case in which the tip of the detection target (for example, a human finger) taps the operation surface (touch area is small) and FIG. 2B is a graph illustrating a variation in the capacitance of each electrode in that case. As shown in FIGS. 2A and 2B, when the touch region between the operation surface and the finger is substantially equal to the distance between the electrodes, the distribution of a variation in the capacitance of a plurality of electrodes has a shape approximate to a curve in which a touch portion of the detection target is a peak (see FIG. 2B). This is because a variation in the capacitance of the electrode is substantially inversely proportional to the distance between the finger and the operation surface in a region in the vicinity of the touch region (a small region between the operation surface and the finger). Therefore, in this case, it is preferable that a curve approximation method of calculating the peak of a curve be applied to calculate the coordinate of the detection target on the basis of, for example, a peak electrode ($X_2$) with the largest capacitance variation and a variation in the capacitance of the electrodes (for example, $X_1$ and/or $X_3$) adjacent to the peak electrode.

In many cases, the curve obtained at that time is regarded as a parabola, which facilitates regression calculation in a small section. Therefore, it is possible to perform regression calculation. When the distance between the electrodes is long and an output error is small, it is preferable to use a variation in the capacitance of a minimum of three electrodes (for example, electrodes $X_1$ to $X_3$) required for application of a quadratic curve as a data range used for the regression calculation, in order to simplify the mathematical process. On the other hand, when the distance between the electrodes is short and the output error is large, it is preferable to apply a curve with a minimum distance to the data group, using a variation in the capacitance of four or more (odd number of electrodes around the peak electrode) electrodes.

As such, when the tip of the finger touches the operation surface (the touch area is small), the curve approximation method is used to calculate the coordinates, thereby excluding the unintended influence of the finger on an operation. In this way, it is possible to simplify the arithmetic process and accurately calculate a portion with the largest capacitance variation when the finger touches.

Figure 3A:
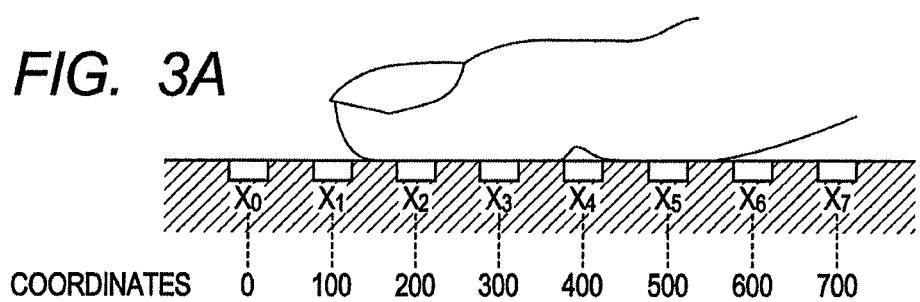
FIG. 3A is a schematic diagram illustrating a case in which the ball of the finger touches the operation surface.
Figure 3B:
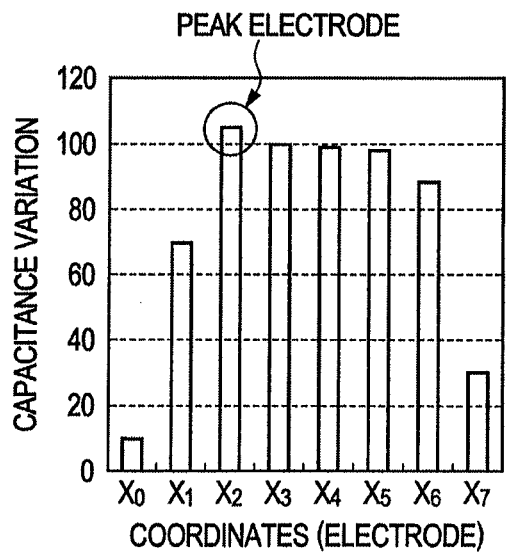
FIGS. 3B and 3C are diagrams illustrating a variation in the capacitance of each electrode.
Figure 3C:
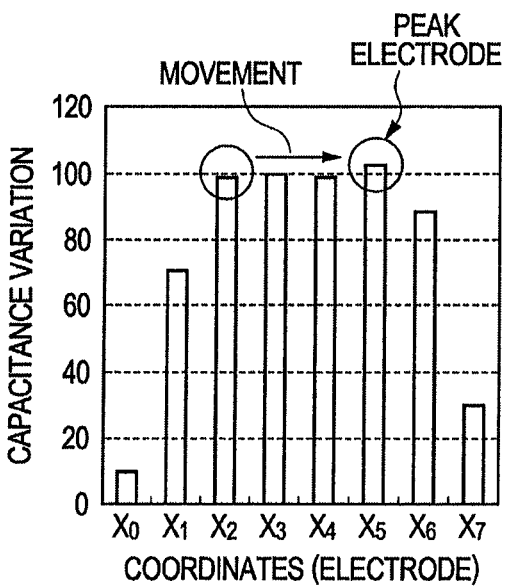

FIG. 3A is a schematic diagram illustrating a case in which the solid finger touches the operation surface (the touch area is large) and FIG. 3B is a graph illustrating a variation in the capacitance of each electrode in that case. As shown in FIGS. 3A to 3C, when the touch area between the operation surface and the detection target is more than the distance between the electrodes, the distribution of a variation in the capacitance of a plurality of electrodes has a trapezoidal shape (see FIG. 3B). This is because capacitance variations are substantially equal to each other in a wide range of the electrodes which the finger touches. Therefore, in this case, it is preferable to apply a centroid calculation method to an electrode with a capacitance variation equal to or greater than a predetermined threshold value to calculate the coordinates of the detection target.

In particular, when the solid finger touches the operation surface, in some cases, the peak electrode is changed (the peak electrode is jumped between the electrodes) even though the finger slightly moves (see FIG. 3C). When the centroid calculation method is applied to calculate the coordinates of the detection target, it is possible to reduce a variation in the calculated coordinates even when the peak electrode is changed.

When the calculation method is changed depending on the state of use to calculate the coordinates of the detection target, it is possible to accurately calculate the coordinates regardless of how the detection target touches the operation surface. In addition, the calculation method to be applied can be selected on the basis of the state (distribution) of a variation in the capacitance of a plurality of electrodes. For example, when the peak electrode is detected and the absolute value of the difference between a variation in the capacitance of the peak electrode and a variation in the capacitance of an electrode adjacent to the peak electrode is equal to or less than a predetermined value, the centroid calculation method is applied. When the absolute value is greater than the predetermined value, the curve approximation method is applied. As such, since the variation in the capacitance of the peak electrode is compared with the variation in the capacitance of the electrode adjacent to the peak electrode, it is possible to appropriately reflect the state of use (how the detection target touches the operation surface).

In some cases, even when the touch area of the finger is small, a large amount of noise is detected. When the curve approximation method is applied with a great influence of noise on the calculation of the coordinates, a large error occurs and the detection accuracy of the coordinates is likely to be reduced. On the other hand, in the centroid calculation method, since noise is averaged by calculation, the influence of noise is less than that in the curve approximation method. Therefore, when the state of noise is checked, it is preferable that the centroid calculation method, not the curve approximation method, be applied to calculate the coordinate of the detection target.

Next, the structure of a coordinate detecting device and a detection coordinate calculating method according to exemplary embodiments of the invention will be described in detail with reference to the accompanying drawings.

FIG. 1 is a block diagram illustrating the main structure of the coordinate detecting device according to an embodiment. A coordinate detecting device 10 shown in FIG. 1 includes a sensor substrate 11, electrodes (X-axis electrodes 12 and Y-axis electrodes 13) that are provided on the sensor substrate 11, detecting units (an X-axis-side detecting unit 14 and a Y-axis-side detecting unit 15) that detect the capacitance of each electrode, and an arithmetic processing unit 18 that performs an arithmetic process using, for example, a variation in the detected capacitance of each electrode.

A plurality of X-axis electrodes 12 that detect capacitance in the X-axis direction (the lateral direction of FIG. 1) and a plurality of Y-axis electrodes 13 that detect capacitance in the Y-axis direction (the longitudinal direction of FIG. 1) are arranged in a matrix on the sensor substrate 11.

The coordinate detecting device 10 according to this embodiment is a type (capacitance type), which detects a capacitance variation when a detection target, such as the finger of the user, touches the operation surface and specifies a touch position on the basis of the variation in the capacitance. That is, the coordinate detecting device 10 calculates coordinates on the basis of a variation in capacitance (capacitance variation) when the detection target touches the operation surface, with respect to the capacitance value of the electrode when the detection target does not touch the operation surface. Examples of the capacitance types include a self-capacitance detection type which detects self-capacitance formed between the electrode and the ground (GND), a mutual capacitance detection type which detects mutual capacitance formed between two electrodes, and a differential mutual capacitance detection type which detects capacitance defined as the difference between the mutual capacitances between a reference electrode and two sensor electrodes. The coordinate detecting device 10 may be any type among them. In the self-capacitance detection type, the capacitance of a touched portion increases (is changed in the positive direction). In the mutual capacitance detection type, the capacitance of a touched portion decreases (is changed in the negative direction).

In the coordinate detecting device according to this embodiment, the X-axis electrodes 12 and the Y-axis electrodes 13 are arranged so as to be orthogonal to each other. However, for example, the arrangement or number of electrodes is not limited to the structure shown in FIG. 1. In addition, the structure of the coordinate detecting device is not particularly limited as long as it can detect coordinates using a capacitance variation.

The X-axis-side detecting unit 14 detects the capacitance of the X-axis electrodes 12 arranged in the X-axis direction. The Y-axis-side detecting unit 15 detects the capacitance of the Y-axis electrodes 13 arranged in the Y-axis direction. It is preferable that the X-axis-side detecting unit 14 and the Y-axis-side detecting unit 15 sequentially detect the capacitance of the X-axis electrodes 12 and the Y-axis electrodes 13 along the X-axis direction and the Y-axis direction, respectively. In the coordinate detecting device 10 according to this embodiment, the X-axis-side detecting unit 14 and the Y-axis-side detecting unit 15 may directly detect the capacitance variation of each electrode. In this case, the X-axis-side detecting unit 14 and the Y-axis-side detecting unit 15 compare the capacitance value of each electrode with the capacitance value (reference capacitance value) of each electrode when the detection target does not touch and obtain a capacitance variation. However, this embodiment is not limited thereto. For example, the X-axis-side detecting unit 14 and the Y-axis detecting unit 15 may detect the capacitance value of each electrode, and another circuit, such as the arithmetic processing unit 18, may compare the obtained capacitance value with the reference capacitance value, thereby calculating a variation in the detected capacitance of the electrode.

An A/D (analog/digital) conversion unit 16 converts the detection signal (data for the capacitance of the X-axis electrode 12) of the X-axis-side detecting unit 14 and the detection signal (data for the capacitance of the Y-axis electrode 13) of the Y-axis-side detecting unit 15 into digital signals and supplies the digital signals to the arithmetic processing unit 18 and a storage unit 17.

The storage unit 17 has a storage area for storing, for example, the detected capacitance of the electrodes. A medium which stores a program to be executed by the arithmetic processing unit 18 in addition to the capacitance variation may be used as the storage unit 17. In this embodiment, data which is detected by the X-axis-side detecting unit 14 and the Y-axis-side detecting unit 15 is supplied to the storage unit 17 through the arithmetic processing unit 18. However, the detected data may be directly supplied from the X-axis-side detecting unit 14 and the Y-axis-side detecting unit 15 to the storage unit 17 through the A/D conversion unit 16.

As described above, when the arithmetic processing unit 18 calculates the variation in the capacitance of each electrode, the capacitance value of each electrode detected by the X-axis-side detecting unit 14 is stored as capacitance in the storage unit 17. When the X-axis-side detecting unit 14 detects the capacitance variation of each electrode, the detected capacitance variation may be stored in the storage unit 17.

The arithmetic processing unit 18 performs an arithmetic process on the basis of, for example, the detected capacitance variation of each electrode to calculate the coordinates of a portion which the detection target touches. In addition, the arithmetic processing unit 18 calculates the coordinates of the detection target, using different calculation methods according to the state of the detected capacitance variation of a plurality of electrodes.

For example, the arithmetic processing unit 18 compares the capacitance variation of an electrode (peak electrode) with the largest capacitance variation with the capacitance variation of an electrode adjacent to the peak electrode. The arithmetic processing unit 18 uses different calculation methods when a comparison value (for example, a difference value) is equal to or less than a predetermined value ($NEAR_{TH}$) and when the comparison value is greater than the predetermined value $NEAR_{TH}$. When the influence of noise is large, the arithmetic processing unit 18 may change the calculation method depending on the detection of noise.

Specifically, when the absolute value of the difference between the capacitance variation of the peak electrode and the capacitance variation of an electrode adjacent to the peak electrode is equal to or less than the predetermined value ($NEAR_{TH}$), the arithmetic processing unit 18 determines that the solid finger touches the operation surface (touch area is large) and uses the centroid calculation method. When the absolute value is greater than $NEAR_{TH}$, the arithmetic processing unit 18 determines that the tip of the finger touches the operation surface (touch area is small) and uses the curve approximation method.

When the curve approximation method is used and the absolute value of the difference between the moving average value of the detection target and the calculation result of the curve approximation method is maintained to be greater than a noise threshold value ($NC_{TH}$) for a predetermined period or more, the arithmetic processing unit 18 may change the curve approximation method to the centroid calculation method and use the centroid calculation method. As such, the arithmetic processing unit 18 can use an appropriate calculation method to calculate the coordinates of the detection target, according to the state of use.

When the curve approximation method is changed to the centroid calculation method due to the influence of noise, it is preferable that the arithmetic processing unit 18 continuously use the centroid calculation method until the detection target is separated from the operation surface after the absolute value is maintained to be greater than the noise threshold value for the predetermined period or more. The calculation results of the curve approximation method and the centroid calculation method are not necessarily identical to each other. Therefore, when the calculation method is changed, the coordinates are changed. Once the calculation method is changed to the centroid calculation method, it is preferable to continuously use the centroid calculation method, in order to minimize the number of times the coordinates are changed due to a change in the calculation method.

When the centroid calculation method is performed due to the detection of noise, it is preferable to select a large number of electrodes in the range in which capacitance is changed in response to the touch of the finger. Therefore, in this case, the range used in the arithmetic process may be set to be the same as that when the solid finger touches. In addition, the arithmetic processing unit 18 may determine whether the detection target touches the operation surface on the basis of a variation in the capacitance of the X-axis electrode 12 or the Y-axis electrode 13. For example, when it is difficult for the X-axis-side detecting unit 14 or the Y-axis-side detecting unit 15 to detect an electrode with a capacitance variation equal to or greater than a predetermined value, the arithmetic processing unit 18 determines that the detection target is separated from the operation surface.

The arithmetic processing unit 18 selects a calculation method suitable for the state of use and calculates the coordinate of the detection target, using a coordinate detecting program, which is stored in the storage unit 17 or a separate memory. The coordinate detecting program includes, for example, a step of recognizing the peak electrode from a plurality of electrodes, a step of selecting the calculation method on the basis of the state of the capacitance variations of the plurality of electrodes, and a step of calculating the coordinates of the detection target using the selected calculation method. In addition, the coordinate detecting program may further include a step of detecting noise and a step of calculating the coordinates of the detection target using a predetermined calculation method when noise is detected.

An interface unit 19 is a circuit for data communication between the coordinate detecting device 10 and a circuit or apparatus with a different structure. For example, when the coordinate detecting device 10 according to this embodiment is applied to a pointing device (input device), such as a touch pad of a personal computer, it may be connected to an apparatus which outputs coordinates to a display unit of the personal computer through the interface unit 19. When the coordinate detecting device according to this embodiment is incorporated into a display screen of a portable apparatus, such as a mobile phone terminal or a PDA, it may be connected to a circuit which performs an operation or process corresponding to the coordinates specified by the arithmetic processing unit 18 through the interface unit 19. As such, the coordinate detecting device according to this embodiment can be incorporated into various coordinate input devices.

In the coordinate detecting device 10 according to this embodiment, the arithmetic processing unit 18 may set a coordinate region (finger recognition region) including specific electrodes among a plurality of electrodes detected by the detecting units (the X-axis-side detecting unit 14 and the Y-axis-side detecting unit 15) in advance, apply the above-mentioned calculation method to the electrodes in the coordinate region, and calculate the coordinates of the detection target. In this case, it is not necessary to perform the arithmetic process considering all of the electrodes on the operation surface, and the arithmetic process can be performed only in a predetermined coordinate region. Therefore, it is possible to simplify the arithmetic process for calculating the coordinates of the detection target. In addition, as the coordinate region including specific electrodes, a rough region of the operation surface which the detection target touches may be selected. For example, the coordinate region may be a region including the electrode whose capacitance variation due to the touch of the detection target satisfies a specific condition.

Figure 4:
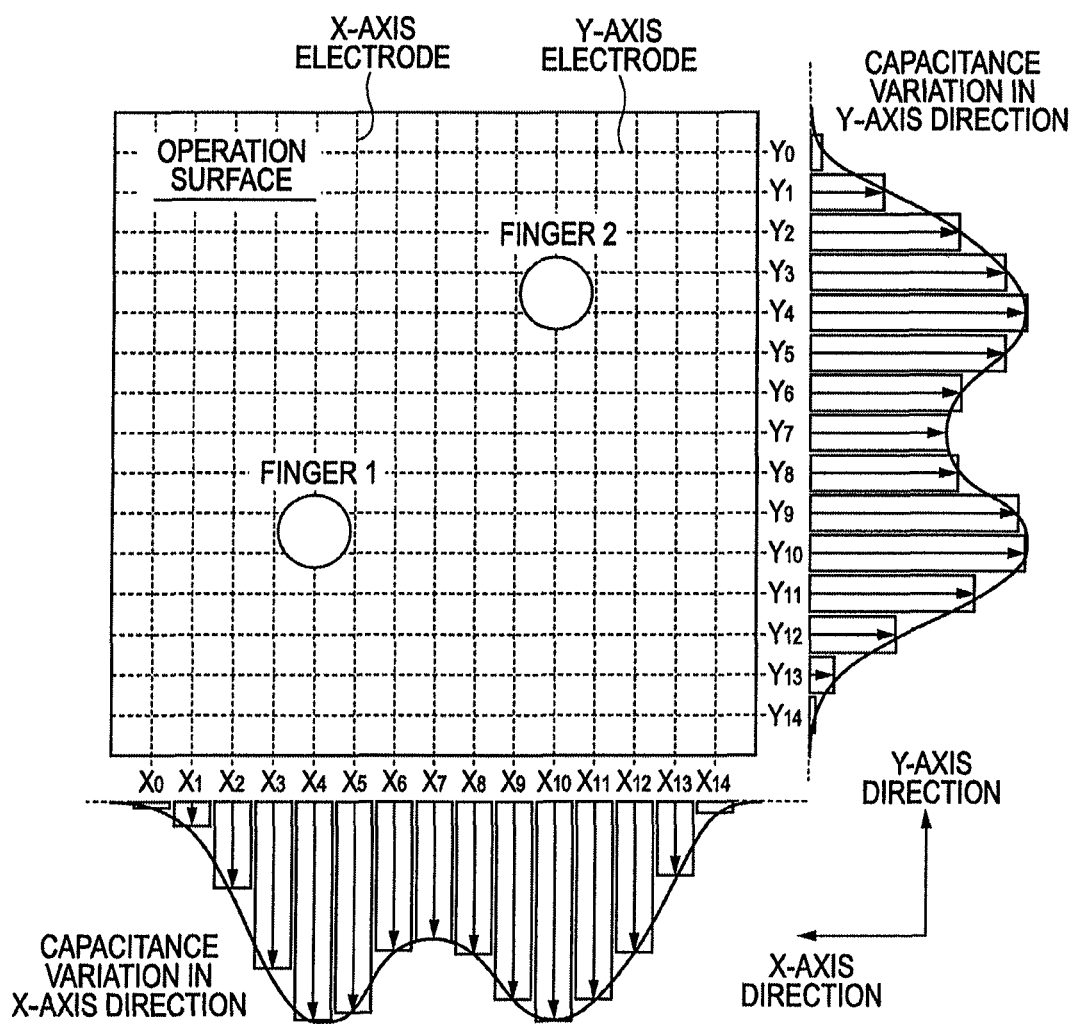
FIG. 4 is a diagram illustrating an example of the operation surface of the coordinate detecting device according to this embodiment and a capacitance variation detected in the X-axis direction and the Y-axis direction of the operation surface.

Next, a process of determining the coordinates of the detection target in the coordinate detecting device according to this embodiment will be described in detail. In the following description, as shown in FIG. 4, a coordinate determining process when two fingers (finger 1 and finger 2) simultaneously touch the operation surface on which 15 X-axis electrodes ($X_0$ to $X_{14}$) and 15 Y-axis electrodes ($Y_0$ to $Y_{14}$) are arranged in a matrix will be described. However, the number of X-axis electrodes 12 and Y-axis electrodes 13 and the number of fingers which can be detected are not limited thereto.

In this case, a case will be described in which the coordinate region (finger recognition region) including the electrodes whose capacitance variation due to the touch of the finger satisfies a specific condition is determined in advance and the coordinates of the detection target is calculated using the electrodes in the finger recognition region. The following description focuses on a process of determining the coordinates of finger 1 in the X-axis direction. The coordinates of finger 1 in the Y-axis direction and the coordinates of finger 2 in the X-axis direction and the Y-axis direction can be calculated by the same process as described above.

<Finger Recognition Region Determining Step>

The arithmetic processing unit 18 includes a non-transitory computer readable medium, comprising computer program codes that determines the number of regions which the detection target touches or the finger recognition region on the basis of the capacitance variations of a plurality of electrodes detected by the X-axis-side detecting unit 14. For example, the arithmetic processing unit 18 may determine a region including a plurality of successive electrodes with a capacitance variation equal to or greater than a predetermined value to be the finger recognition region.

The arithmetic processing unit 18 may compare the capacitance variations of each electrode and adjacent electrodes (calculate the difference between the capacitance variations) and determine the finger recognition region on the basis of the comparison value and the magnitude of the detected capacitance variation of the electrode. In this case, the X-axis-side detecting unit 14 may sequentially detect the capacitance variations of a plurality of electrodes from one end to the other end of the X-axis electrode 12, and the arithmetic processing unit 18 may determine the finger recognition region on the basis of, for example, the comparison value between the capacitance variations of adjacent electrodes among the plurality of electrodes which are sequentially detected. Since the finger recognition region is determined on the basis of the comparison value between the capacitance variations of adjacent electrodes, it is not necessary to store the capacitance variations of all of the electrodes in the storage area at the same time and it is possible to determine the finger recognition region with a simple arithmetic process.

In the finger recognition region determining step, any determination method may be used as long as it can specify the number of regions which the detection target touches or the finger recognition region. The finger recognition region determining step may be omitted when the number of regions which the detection target touches is one (one finger touches), or considering the size of the operation surface.

<Peak Electrode Recognizing Step>

In the peak electrode recognizing step, the arithmetic processing unit 18 recognizes the peak electrode on the basis of the capacitance variation of each electrode detected by the X-axis-side detecting unit 14. In this embodiment, an electrode with the largest capacitance variation among the electrodes in the finger recognition region is recognized as the peak electrode. A method of recognizing the peak electrode may be determined, for example, by comparing the capacitance variations of a plurality of electrodes in the finger recognition region.

<Calculation Method Selecting Step>

Next, the arithmetic processing unit 18 selects a calculation method to be applied to determine the coordinates of the detection target on the basis of the state of the capacitance variations of a plurality of electrodes.

The arithmetic processing unit 18 calculates the difference between the capacitance variation of the peak electrode and the capacitance variation of electrodes (electrode which is not adjacent to the peak electrode) other than the electrodes adjacent to the peak electrode, and determines whether the absolute value of the difference is equal to or less than a predetermined value ($NEAR_{TH}$), or greater than $NEAR_{TH}$. When the absolute value of the difference is equal to or less than $NEAR_{TH}$, the arithmetic processing unit 18 selects the centroid calculation method. When the absolute value of the difference is greater than $NEAR_{TH}$, the arithmetic processing unit 18 selects the curve approximation method.

Figure 5A:
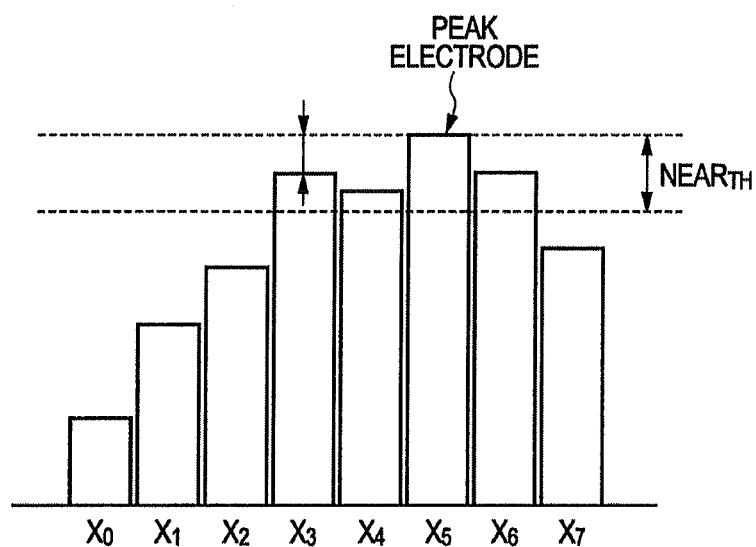
FIGS. 5A and 5B are diagrams illustrating an example of a variation in the capacitance of each electrode in a finger recognition region.

For example, when the capacitance variation of each electrode in the finger recognition region ($X_0$ to $X_7$) is detected as shown in FIG. 5A, first, the arithmetic processing unit 18 recognizes the electrode ($X_5$) with the largest capacitance variation as the peak electrode in the peak electrode recognizing step. Then, the arithmetic processing unit 18 compares the capacitance variation of the peak electrode ($X_5$) with the capacitance variation of the electrodes ($X_0$ to $X_3$ and $X_7$) which are not adjacent to the peak electrode. Here, the absolute value of the difference between the capacitance variation of the peak electrode ($X_5$) and the capacitance variation of the electrode ($X_3$), which is not adjacent to the peak electrode, is equal to or less than the predetermined value ($NEAR_{TH}$). In this case, the arithmetic processing unit 18 determines that the solid finger touches the operation surface (touch area is large) and uses the centroid calculation method.

Figure 5B:
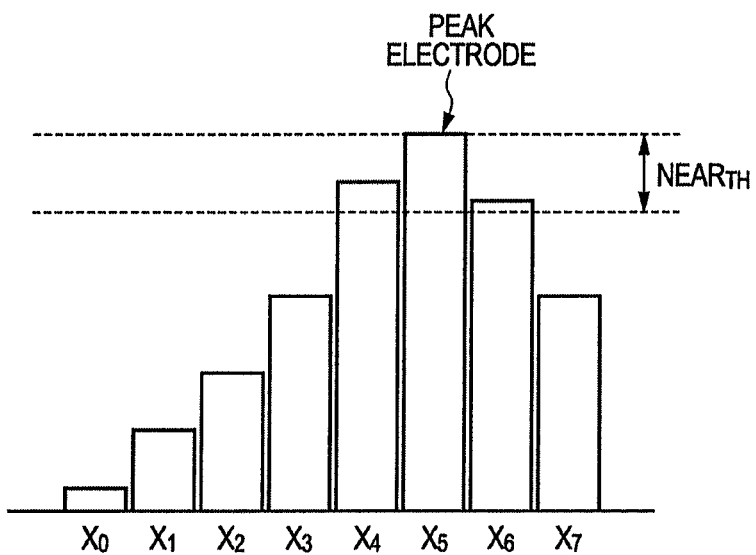

When the capacitance variation of each electrode in the finger recognition region ($X_0$ to $X_7$) is detected as shown in FIG. 5B, the absolute value of the difference between the capacitance variation of the peak electrode ($X_5$) and the capacitance variation of the electrodes ($X_0$ to $X_3$ and $X_7$) which are not adjacent to the peak electrode is greater than the predetermined value ($NEAR_{TH}$). In this case, the arithmetic processing unit 18 determines that the tip of the finger touches the operation surface (touch area is small) and uses the curve approximation method.

In this embodiment, as a method of selecting the calculation method, the capacitance variation of the peak electrode ($X_5$) and the capacitance variation of the electrodes ($X_0$ to $X_3$ and $X_7$), which are not adjacent to the peak electrode are compared with each other. However, the comparison target may be changed depending on the conditions of the distance between the electrodes. For example, when the distance between the electrodes is short, the capacitance variation of the peak electrode ($X_5$) may be compared with the capacitance variation of the electrodes ($X_0$ to $X_2$), which are separated from the peak electrode with two or more electrodes interposed therebetween.

After selecting the calculation method, the arithmetic processing unit 18 calculates the coordinates of the detection target using the selected calculation method.

<Coordinate Calculating Step Using Centroid Calculation Method>

Figure 6A:
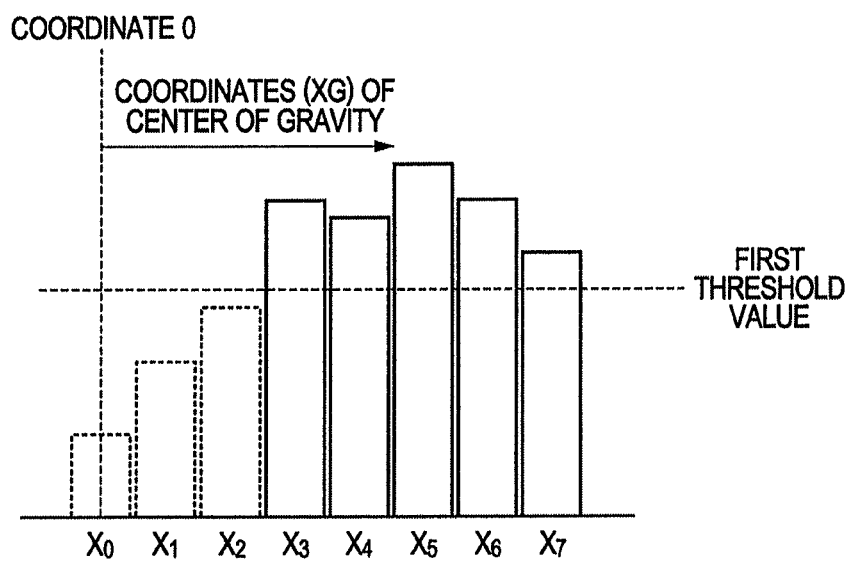
FIGS. 6A and 6B are diagrams illustrating a calculation method which is applied depending on a variation in the capacitance of each electrode in the finger recognition region.

When the centroid calculation method is performed, the arithmetic processing unit 18 performs the arithmetic process on the basis of the capacitance variation of each electrode in the finger recognition region. For example, the arithmetic processing unit 18 may perform the centroid calculation method for the electrodes (in FIG. 6A, $X_3$ to $X_7$) in a first region which includes at least successive electrodes with a capacitance variation equal to or more than a first threshold value from the peak electrode ($X_5$). Preferably, a region which includes the successive electrodes ($X_3$ to $X_7$) with a capacitance variation equal to or greater than the first threshold value from the peak electrode and the electrode ($X_2$) or the electrodes ($X_2$ and $X_1$), which are the first and second electrodes with a capacitance variation less than the first threshold value, is set as the first recognition region. In this way, it is possible to improve the detection accuracy of coordinates.

As such, in some cases, in the centroid calculation method, the arithmetic process is performed using the capacitance variation of all of the electrodes in the finger recognition region or only the capacitance variation of some electrodes, according to the detected capacitance variation of each electrode.

In the centroid calculation method, the arithmetic processing unit 18 can calculate the coordinates (XG) of the detection target using the following Expression 1:

$$XG = (\Sigma n X_n / \Sigma X_n) \times RESO \qquad \text{[Expression 1]}$$

(where n is an electrode number used in calculation, $X_n$ indicates the capacitance variation of an electrode n, and RESO indicates resolution between the electrodes).

For example, when three electrodes are $X_0$ to $X_2$, the coordinates of the electrode $X_0$ is 0, and the resolution between the electrodes is 100, the coordinates of the centroid is calculated using the above-mentioned Expression 1 as follows:

XG=(0*the capacitance variation of $X_0$+1*the capacitance variation of $X_1$+2*the capacitance variation of $X_2$)/(the capacitance variation of $X_0$+the capacitance variation of $X_1$+the capacitance variation of $X_2$)×100.

In the centroid calculation method, even when the touch area between the detection target and the operation surface is large (operation with the solid finger), it is possible to reduce a change in the calculated coordinates. In addition, since noise is averaged by calculation, the influence of noise is less than that in the curve approximation method.

<Coordinate Calculating Step Using Curve Approximation Method>

Figure 6B:
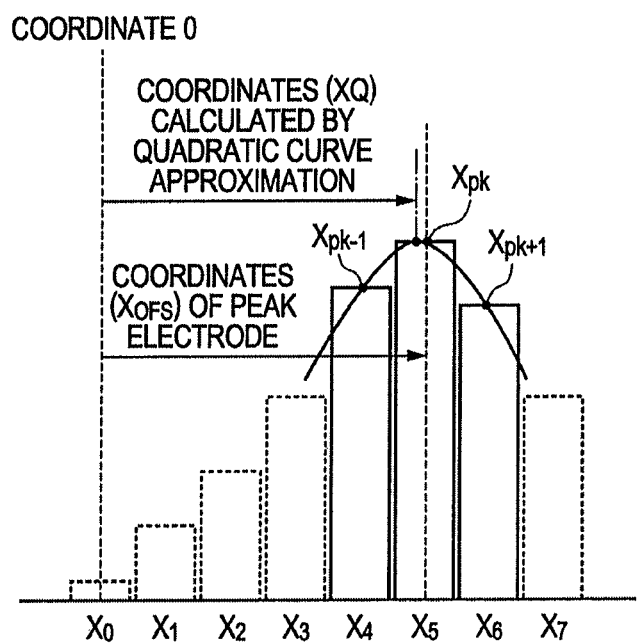

When the curve approximation method is performed, the arithmetic processing unit 18 performs an arithmetic process on the basis of the capacitance variation of a predetermined electrode selected from the finger recognition region, similarly to the centroid calculation method. For example, the arithmetic processing unit 18 may perform the curve approximation method using the capacitance variations of electrodes in a second region including at least the peak electrode ($X_5$) and the electrodes (for example, in FIG. 6B, $X_4$ and/or $X_6$) in the vicinity of the peak electrode.

For example, the arithmetic processing unit 18 calculates the coordinates (XQ) of the detection target on the basis of the capacitance variations of three electrodes, that is, the peak electrode ($X_5$) and two electrodes ($X_4$ and $X_6$) in the vicinity of the peak electrode using a quadratic curve approximation method and the following Expression 2:

$$XQ = \frac{X_{pk-1} - X_{pk+1}}{2(X_{pk-1} + X_{pk+1} - 2X_{pk})} \times RESO + X_{OFS} \qquad \text{[Expression 2]}$$

(where $X_{pk}$ indicates the capacitance variation of the peak electrode, $X_{pk-1}$ and $X_{pk+1}$ indicate the capacitance variations of electrodes adjacent to the peak electrode, RESO indicates resolution between electrodes, and $X_{OFS}$ indicates the coordinates of the peak electrode).

As such, when the curve approximation method is used, the capacitance variations of the electrodes in the vicinity of the peak electrode are selectively used to calculate the coordinates. Therefore, it is possible to exclude the unintended influence of the finger on an operation. As a result, it is possible to accurately calculate the coordinates of a portion with the largest capacitance variation due to the touch of the detection target.

The arithmetic processing unit 18 may calculate the coordinates using a method of calculating a regression curve for a quadratic curve, instead of using the above-mentioned Expression 2 and the quadratic curve approximation method.

Similarly to the centroid calculation method, the arithmetic processing unit 18 may set, as a second region, a region which includes at least successive electrodes with a capacitance variation equal to or greater than a predetermined threshold value from the peak electrode ($X_5$) and calculate the coordinates of the detection target using the curve regression calculating method. The second recognition region may include successive electrodes with a capacitance variation equal to or greater than a second threshold value from the peak electrode and the first electrode or the first and second electrodes with a capacitance variation less than the second threshold value. The second threshold value may be the same as the first threshold value used in the centroid calculation method.

Figure 11A:
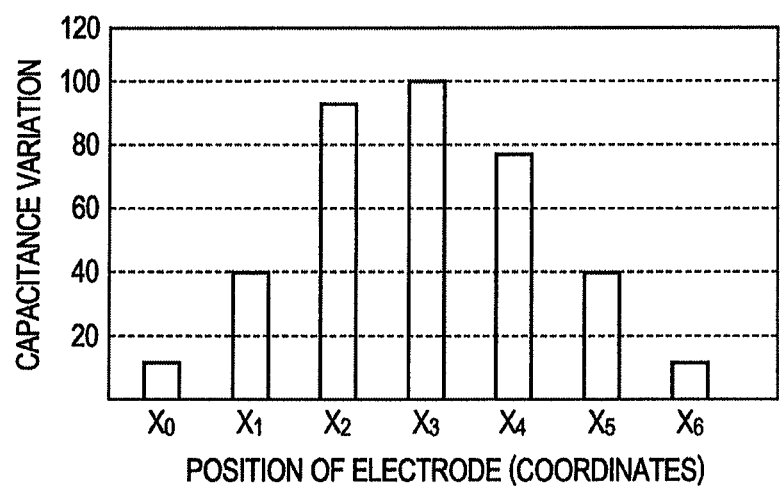
FIGS. 11A and 11B are diagrams illustrating a method of calculating the coordinates using data for two electrodes as the curve approximation method.

The arithmetic processing unit 18 may calculate the coordinates of the detection target using the fact that the gradient of the peak of the curve is zero on the basis of two electrodes (the peak electrode and an electrode adjacent to the peak electrode). Next, a method of calculating the coordinates on the basis of two electrodes will be described in detail. A case in which the capacitance variation of each electrode is detected as shown in FIG. 11A will be described below.

Figure 11B:
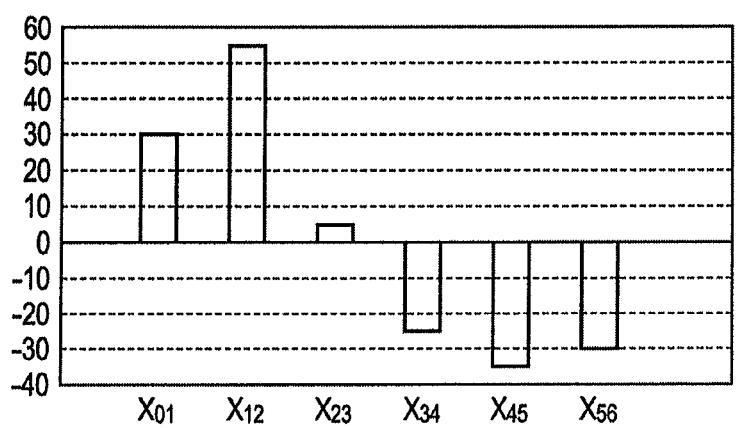

First, the difference between the capacitance variations of adjacent electrodes is calculated on the basis of the obtained data (see FIG. 11A) (see FIG. 11B). In FIG. 11B, "$X_{01}$" indicates the difference between the capacitance variation of the electrode $X_1$ and the capacitance variation of the electrode $X_0$ ($X_{01} = X_1 - X_0$). In this case, in FIG. 11B, there is a peak (gradient is zero) between a portion with a positive difference value and a portion with a negative difference value (between the center between $X_2$ and $X_3$ and the center between $X_3$ and $X_4$).

Therefore, the coordinates where the difference is 0 are calculated on the basis of data for $X_{23}$ and $X_{34}$. Specifically, it is possible to calculate the coordinates (XR=($X_{23}$×RESO)/

($X_{23}+|X_{34}|$) where the difference is zero using the concept of similarity of triangles. Then, the coordinates of the center between the electrodes $X_2$ and $X_3$ are added to the calculated coordinates, thereby calculating the coordinates of the peak of the curve. As such, in the curve approximation method, the coordinates of the detection target may be calculated from data for two electrodes.

As described above, various methods can be applied to the curve approximation method, and the curve approximation method is not limited to a specific method.

<Effect of Each Calculation Method>

Next, the effect when the centroid calculation method and the curve approximation method are switched in the calculation of the coordinates will be described.

Table 1 shows the coordinates calculated by the centroid calculation method and the curve approximation method when the capacitance variation of each electrode is detected as shown in FIG. 2B. In the centroid calculation method, the coordinates of the electrodes $X_0$ to $X_4$ were calculated by the above-mentioned Expression 1. In the curve approximation method, the coordinates of the electrodes $X_1$ to $X_3$ were calculated by the above-mentioned Expression 2. In addition, the resolution between the electrodes (coordinates between the electrodes) was 100.

Figure 7:
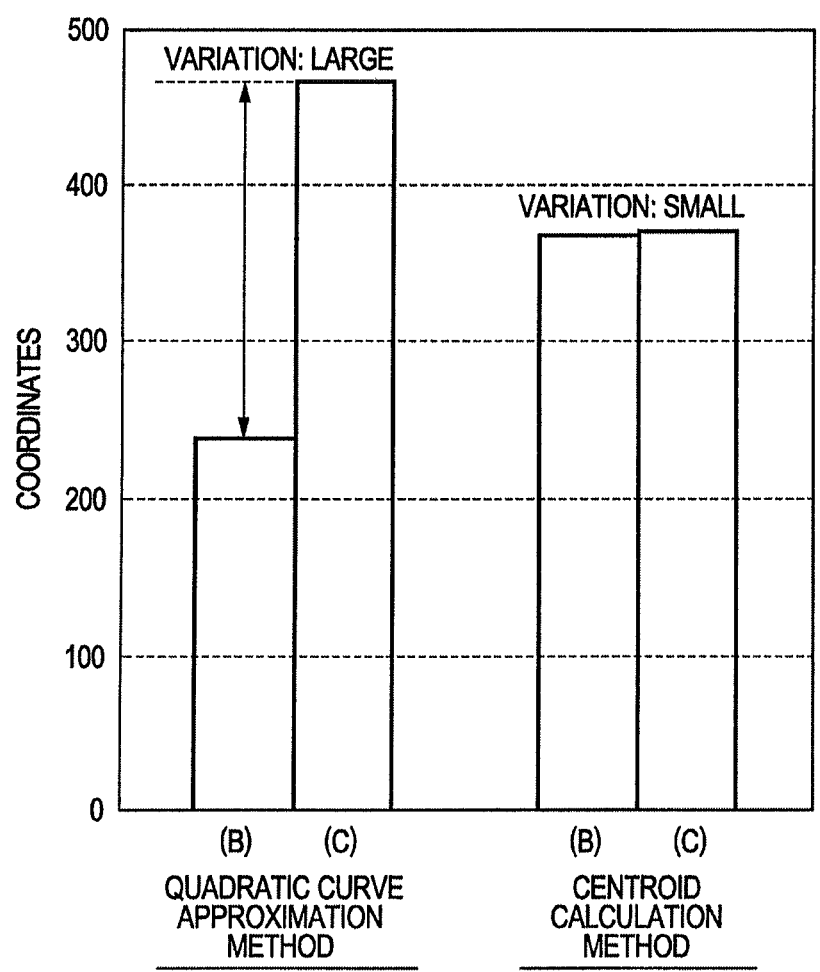
FIG. 7 is a diagram illustrating the comparison between coordinate changes calculated by a centroid calculation method and a curve approximation method.

As shown in Table 2, when the solid finger touches operation surface (touch area is large), the detection accuracy of the coordinates in the centroid calculation method is more than that in the curve approximation method. In particular, in the curve approximation method, there is a large variation in the coordinates calculated in the state shown in FIG. 3B and the state shown in FIG. 3C. However, when the centroid calculation method is used, a variation in the calculated coordinates is small even when the peak electrode is changed (see FIG. 7).

<Coordinate Calculating Step when Noise is Detected>

When the state of noise (for example, jitter noise) is checked during the application of the curve approximation method, the arithmetic processing unit 18 changes the calculation method from the curve approximation method to the centroid calculation method and calculates the coordinates of the detection target.

For example, when the absolute value of the difference between the moving average value of the detection target and the calculation result of the curve approximation method is maintained to be greater than a noise threshold value for a predetermined period or more, the arithmetic processing unit 18 may determine that the current state is a noise state. Next,

TABLE 1

| | Electrode | | | | | | | | Centroid calculation method | Curve approximation method |
|---|---|---|---|---|---|---|---|---|---|---|
| | $X_0$ | $X_1$ | $X_2$ | $X_3$ | $X_4$ | $X_5$ | $X_6$ | $X_7$ | | |
| Coordinates | 0 | 100 | 200 | 300 | 400 | 500 | 600 | 700 | 211 | 210 |
| Capacitance variation | 10 | 70 | 100 | 80 | 20 | 10 | 5 | 5 | — | — |

As shown in Table 1, when the tip of the finger taps the operation surface (touch area is small), it is possible to improve the detection accuracy of the coordinates even when the curve approximation method is used. Since the curve approximation method uses a small amount of data, it is possible to simplify the arithmetic process.

Figure 8:
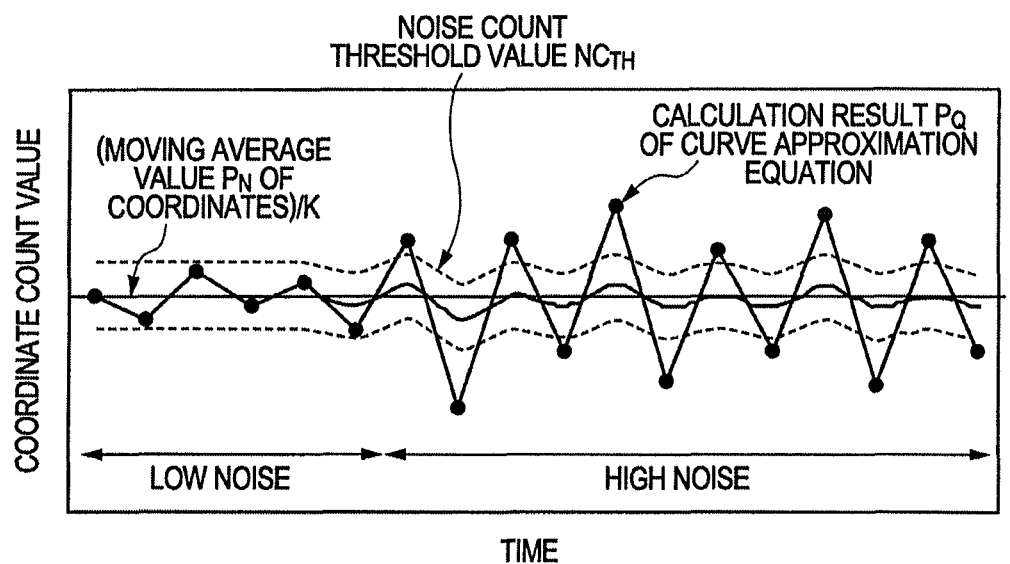
FIG. 8 is a diagram illustrating a method of determining a noise state.

Table 2 shows the coordinates calculated by the centroid calculation method and the curve approximation method when the capacitance variation of each electrode is detected as shown in FIGS. 3B and 3C. In the centroid calculation method, the coordinates of the electrodes $X_0$ to $X_7$ were calculated by the above-mentioned Expression 1. In the curve approximation method, the coordinates of the electrodes $X_1$ to $X_3$ in the case shown in FIG. 3B and the coordinates of the electrodes $X_4$ to $X_6$ in the case shown in FIG. 3C were calculated by the above-mentioned Expression 2. The resolution (coordinates between the electrodes) was 100.

an example of a detailed determination method will be described with reference to FIG. 8.

When the value of the calculation result of the curve approximation method is $P_Q$, the moving average value of the calculation result of the curve approximation method is $P_N$, the moving average value of the past (previous) calculation result of the curve approximation method is $P_{N-1}$, and a filter weight is K, the moving average value of the calculation result of the curve approximation method is $P_N$ is calculated by the following Expression 3:

$$P_N = P_{N-1} \times (K-1)/K + P_Q. \qquad \text{[Expression 3]}$$

The difference (noise count (NC)) between the moving average value of the calculation result of the curve approximation method and the calculation result of the curve

TABLE 2

| | Electrode | | | | | | | | Centroid calculation method | Curve approximation method |
|---|---|---|---|---|---|---|---|---|---|---|
| | $X_0$ | $X_1$ | $X_2$ | $X_3$ | $X_4$ | $X_5$ | $X_6$ | $X_7$ | | |
| Coordinates | 0 | 100 | 200 | 300 | 400 | 500 | 600 | 700 | 367 (B) 370 (C) | 238 (B) 468 (A) |
| Capacitance variation (B) | 10 | 70 | 105 | 100 | 99 | 98 | 88 | 30 | — | — |
| Capacitance variation (C) | 10 | 70 | 99 | 100 | 99 | 102 | 88 | 30 | — | — | approximation method is calculated by the following Expression 4;

$$NC = (P_N/K) - P_Q.$$ [Expression 4]

When the polarities of a (k−1)-th noise count and a k-th noise count which are successively obtained by calculation are not identical to each other and the absolute value of the noise count is greater than a noise count threshold value ($NC_{TH}$), the noise counts are added and the sum of the noise counts is defined as a noise count sum ($NC_{SUM}$).

The arithmetic processing unit 18 checks the noise count sum at a predetermined time interval. When the noise count sum is greater than a prescribed value ($SUM_{TH}$) ($NC_{SUM} > SUM_{TH}$), the arithmetic processing unit 18 determines that the current state is a "noise state" and changes the coordinate calculation method from the curve approximation method to the centroid calculation method. When the noise count sum ($NC_{SUM}$) is checked at a predetermined time interval, it may be cleared to 0 and the process may be repeatedly performed.

When it is checked that the "noise state" is continuously determined a plurality of times, the arithmetic processing unit 18 may change the coordinate calculation method from the curve approximation method to the centroid calculation method, instead of determining the "noise state" when the noise count sum is greater than the prescribed value ($SUM_{TH}$) ($NC_{SUM} > SUM_{TH}$).

As such, when the noise count sum is greater than the noise threshold value for a predetermined period or more, not instantaneously, the current state is determined to be the noise state. Therefore, it is possible to calculate the coordinates while excluding the instantaneous influence of noise. As a result, it is possible to appropriately estimate the influence of noise and calculate the coordinates with high accuracy.

When the curve approximation method is changed to the centroid calculation method due to the influence of noise, it is preferable that the arithmetic processing unit 18 continuously use the centroid calculation method until the detection target is separated from the operation surface after the noise count sum is maintained to be greater than the noise threshold value for a predetermined period or more. In general, the calculation results of the curve approximation method and the centroid calculation method are not necessarily identical to each other. Therefore, when the calculation method is changed, the coordinates are changed. After the calculation method is changed to the centroid calculation method, the centroid calculation method is continuously used. In this way, it is possible to minimize the number of times the coordinates are changed due to a change in the calculation method.

In the determination of the noise state, when the polarities of the (k−1)-th noise count and the k-th noise count, which are continuously obtained by calculation, are not identical to each other, the noise counts are added. In this way, it is possible to prevent the occurrence of an error due to a predetermined operation of the user (prevent an input from being determined to be noise).

Figure 9:
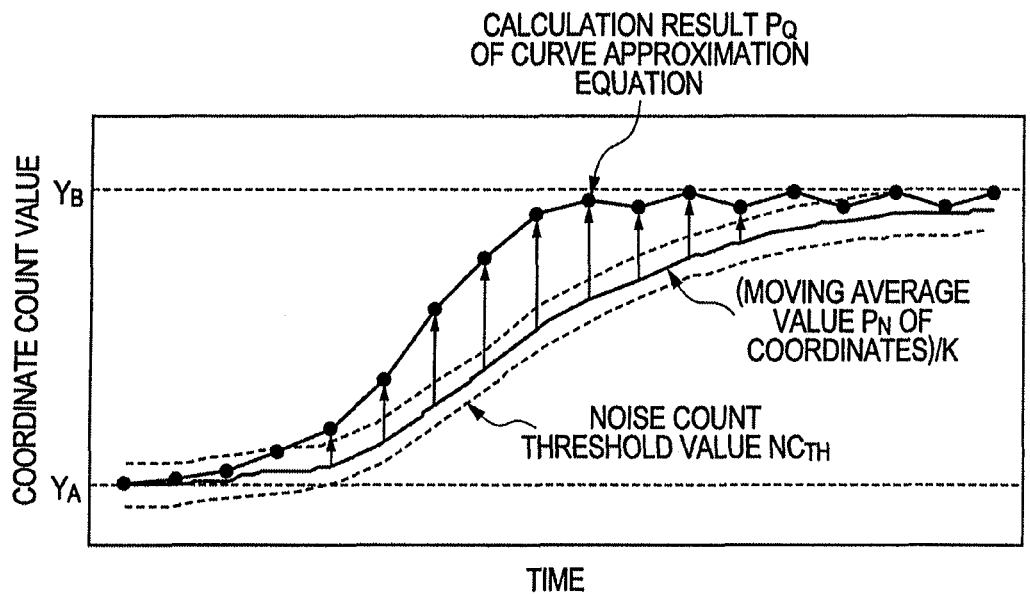
FIG. 9 is a diagram illustrating a method of determining the noise state when a detection target is moved while touching the operation surface.

For example, when the user moves from coordinates $Y_A$ to coordinates $Y_B$ while touching the operation surface with the finger (for example, a drag operation), the moving average value is delayed and follows the movement. As a result, the polarity of the noise count is not changed (see FIG. 9). Therefore, when the polarities of the noise counts of data, which are continuously obtained by calculation, are not identical to each other, noise is counted. In this way, it is possible to exclude an operation corresponding to the movement operation of the user from the addition of the noise counts such that the operation is not recognized as noise.

Figure 10A:
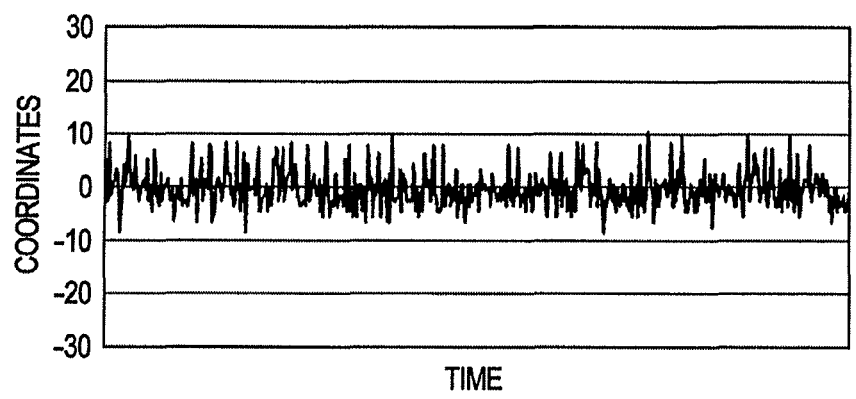
FIGS. 10A and 10B are diagrams illustrating the coordinate changes calculated by the centroid calculation method and the curve approximation method in the noise state.
Figure 10B:
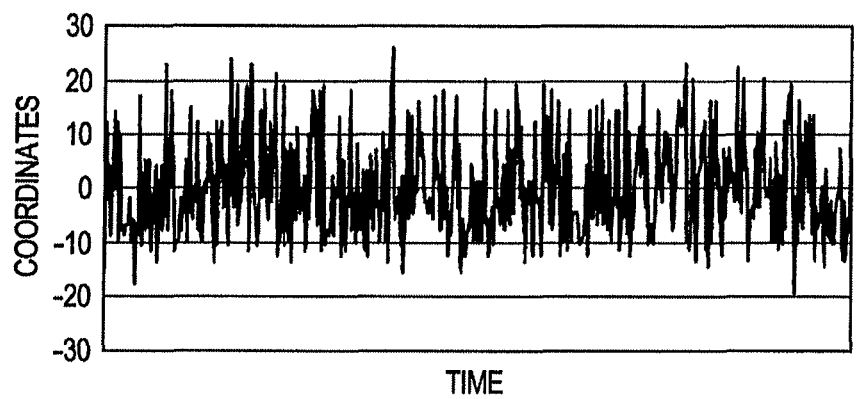

FIGS. 10A and 10B are diagrams illustrating a change in the coordinates when the coordinates are calculated by the centroid calculation method and the curve approximation method in the noise state. FIGS. 10A and 10B show the coordinate output results when a white noise of 20 Vpp is applied to an iron pole (φ: 8 mm) which touches the operation surface. FIG. 10A shows a change in the coordinates calculated by the centroid calculation method in the noise state and FIG. 10B shows a change in the coordinates calculated by the quadratic curve approximation method in the noise state.

The standard deviation of each calculation method was calculated on the basis of the obtained result. In the centroid calculation method, the standard deviation was 3.57. In the curve approximation method, the standard deviation was 9.59. When the centroid calculation method was used, noise was reduced by 63%, and the influence of noise was less than that in the curve approximation method.

As described above, the calculation method is changed depending on the state of the detected capacitance variations of a plurality of electrodes to calculate the coordinates. In this way, even when the state of use is changed, it is possible to prevent a reduction in the detection accuracy of the coordinates.

The invention is not limited to the above-described embodiment. Various modifications and changes of the invention can be made without departing from the scope and spirit of the invention.

It should be understood by those skilled in the art that various modifications, combinations, sub-combinations and alterations may occur depending on design requirements and other factors insofar as they are within the scope of the appended claims of the equivalents thereof.

What is claimed is:

1. A coordinate detecting device comprising:
   a plurality of electrodes arranged in a predetermined direction;
   a detecting unit configured to detect the capacitance of each of the plurality of electrodes; and
   an arithmetic processing unit configured to calculate the coordinates of a detection target using different calculation methods according to the state of a variation in the capacitance of the plurality of electrodes,
   wherein the arithmetic processing unit calculates the coordinates of the detection target, using a centroid calculation method of calculating the coordinates of the centroid when a first touch condition is detected, and using a curve approximation method of calculating a peak of a curve when a second touch condition is detected,
   wherein a touch area under the first touch condition is larger than a touch area under the second touch condition,
   wherein the arithmetic processing unit switches from one of the centroid calculation method and the curve approximation method to the other of the centroid calculation method and the curve approximation method according to the conditions in relation to the touch areas,
   wherein the arithmetic processing unit determines a region to be a first recognition region when the region includes electrodes with a capacitance variation equal to or greater than a first threshold value successive from the peak electrode and determines a region to be a second recognition region when the region includes electrodes with a capacitance variation equal to or greater than a second threshold value successive from the peak electrode,
   wherein when an absolute value of the difference between the capacitance variation of the peak electrode and the capacitance variation of the electrode which is not adjacent to the peak electrode in the first recognition region is equal to or less than a predetermined value, the arithmetic processing unit applies the centroid calculation method to the electrodes in the first recognition region, thereby calculating the coordinates of the detection target, and when the absolute value of the difference between the capacitance variation of the peak electrode and the capacitance variation of the electrode which is not adjacent to the peak electrode is greater than the predetermined value, the arithmetic processing unit applies the curve approximation method to at least the peak electrode and an electrode adjacent to the peak electrode in the second recognition region, thereby calculating the coordinates of the detection target.

2. The coordinate detecting device according to claim 1, wherein, when an absolute value of the difference between a moving average value of the calculation result of the curve approximation method and the calculation result of the curve approximation method is maintained to be greater than a noise threshold value for a predetermined period or more, the arithmetic processing unit changes the curve approximation method to the centroid calculation method and calculates the coordinates of the detection target, and the arithmetic processing unit continuously uses the centroid calculation method until the detection target is separated after the absolute value is maintained to be greater than the noise threshold value for the predetermined period or more.

3. The coordinate detecting device according to claim 1, wherein, when an absolute value of the difference between a moving average value of the calculation result of the curve approximation method and the calculation result of the curve approximation method is maintained to be greater than a noise threshold value for a predetermined period or more, the arithmetic processing unit changes the curve approximation method to the centroid calculation method and calculates the coordinates of the detection target, and the arithmetic processing unit continuously uses the centroid calculation method until the detection target is separated after the absolute value is maintained to be greater than the noise threshold value for the predetermined period or more.

4. The coordinate detecting device according to claim 1, wherein the arithmetic processing unit determines a region which includes electrodes with a capacitance variation equal to or greater than the first threshold value successive from the peak electrode and a first electrode or the first and second electrodes with a capacitance variation less than the first threshold value.

5. The coordinate detecting device according to claim 1, wherein the arithmetic processing unit performs the centroid calculation method using the following Expression 1:

$$XG = (\Sigma n X_n / \Sigma X_n) \times RESO \qquad \text{[Expression 1]}$$

(where n is an electrode number used in calculation, Xn indicates the capacitance variation of an electrode n, and RESO indicates resolution between the electrodes).

6. The coordinate detecting device according to claim 1, wherein the arithmetic processing unit uses the curve approximation method, on the basis of the capacitance variations of the peak electrode and two electrodes in the vicinity of the peak electrode, using the following Expression 2:

$$XQ = \frac{X_{pk-1} - X_{pk+1}}{2(X_{pk-1} + X_{pk+1} - 2X_{pk})} \times RESO + X_{OFS} \qquad \text{[Expression 2]}$$

(where Xpk indicates the capacitance variation of the peak electrode, Xpk−1 and Xpk+1 indicate the capacitance variations of electrodes adjacent to the peak electrode, RESO indicates resolution between electrodes, and XOFS indicates the coordinates of the peak electrode).

7. The coordinate detecting device according to claim 1, wherein the arithmetic processing unit sets, as a second recognition region, a region which includes successive electrodes with a capacitance variation equal to or greater than a second threshold value from the peak electrode and applies the curve approximation method to the region.

8. The coordinate detecting device according to claim 7, wherein the arithmetic processing unit sets a predetermined coordinate region including electrodes whose capacitance is changed due to the touch of the detection target among the plurality of electrodes detected by the detecting unit in advance, compares the capacitance variation of the peak electrode and the capacitance variation of the electrode which is not adjacent to the peak electrode among the electrodes in the predetermined coordinate region, and switches the centroid calculation method and the curve approximation method.

9. The coordinate detecting device according to claim 7, wherein the arithmetic processing unit sets, as the second recognition region, a region which includes successive electrodes with a capacitance variation equal to or greater than a second threshold value from the peak electrode and a first electrode or the first and second electrodes with a capacitance variation less than the second threshold value.

10. The coordinate detecting device according to claim 9, wherein the arithmetic processing unit sets a predetermined coordinate region including electrodes whose capacitance is changed due to the touch of the detection target among the plurality of electrodes detected by the detecting unit in advance, compares the capacitance variation of the peak electrode and the capacitance variation of the electrode which is not adjacent to the peak electrode among the electrodes in the predetermined coordinate region, and switches the centroid calculation method and the curve approximation method.

11. The coordinate detecting device according to claim 1, wherein the arithmetic processing unit sets a predetermined coordinate region including electrodes whose capacitance is changed due to the touch of the detection target among the plurality of electrodes detected by the detecting unit in advance, compares the capacitance variation of the peak electrode and the capacitance variation of the electrode which is not adjacent to the peak electrode among the electrodes in the predetermined coordinate region, and switches the centroid calculation method and the curve approximation method.

12. The coordinate detecting device according to claim 1, further comprising:

a plurality of orthogonal electrodes arranged in a direction perpendicular to the predetermined direction, wherein the arithmetic processing unit uses different calculation methods according to the state of a variation in the capacitance of the plurality of orthogonal electrodes detected in the orthogonal direction.

13. A coordinate input device that controls the input of coordinates using the coordinate detecting device according to claim 1.

* * * * *